United States Patent

[11] 3,537,499

| [72] | Inventors | Ervin J. Dey<br>Santa Fe Springs;<br>Harry A. Theakston, Jr., Santa Ana,<br>California |
|---|---|---|
| [21] | Appl. No. | 661,030 |
| [22] | Filed | Aug. 16, 1967 |
| [45] | Patented | Nov. 3, 1970 |
| [73] | Assignee | Standard Pressed Steel Co.<br>Jenkintown, Pennsylvania<br>a corporation of Pennsylvania |

[54] FLOATING FASTENER UNIT
7 Claims, 5 Drawing Figs.

[52] U.S. Cl. .................................................. 151/41.76,
151/21
[51] Int. Cl. ...................................................... F16b 1/00,
F16b 39/284
[50] Field of Search ........................................... 151/41.76,
41.75, 41.7, 41.71, 21B

[56] References Cited
UNITED STATES PATENTS

| 2,144,553 | 1/1939 | Simmonds ..................... | 151/41.76 |
| 2,374,548 | 4/1945 | Leisure ........................... | 151/41.76 |
| 2,816,591 | 12/1957 | Reiner ........................... | 151/21(B)UX |
| 3,180,387 | 4/1965 | Dzus et al. ..................... | 151/41.76 |
| 3,259,164 | 7/1966 | Hernadi ......................... | 151/41.76 |

*Primary Examiner*—Marion Parsons, Jr.
*Attorney*—Stanley Belsky

ABSTRACT: A fastener unit in which a fastener element is contained within a retainer shell by means of a removable retainer clip. The shell has a plurality of flanges which extend around a substantial portion of its periphery and which are separated by spaces into which lugs on the fastener element extend. The retainer clip, extending around the periphery of the shell, passes under the flanges and over the lugs to captivate the fastener element in the shell.

Patented Nov. 3, 1970
3,537,499
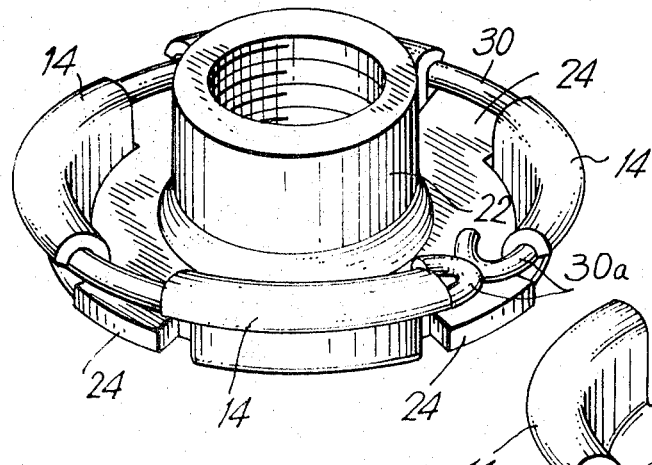
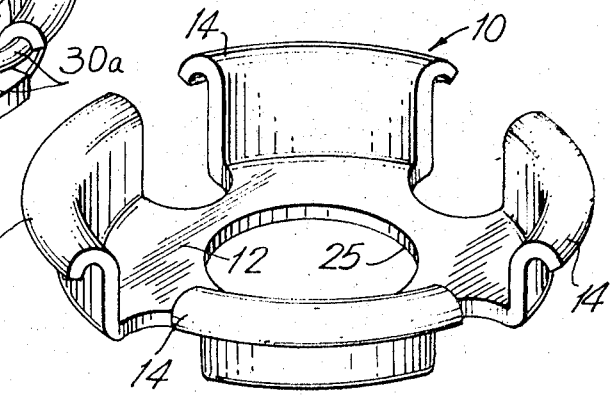
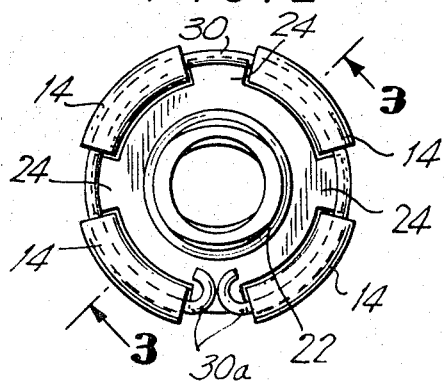
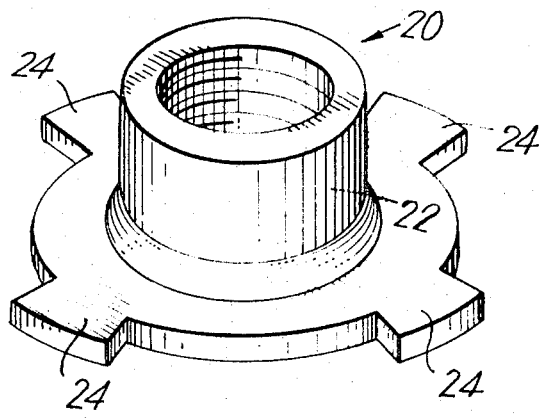
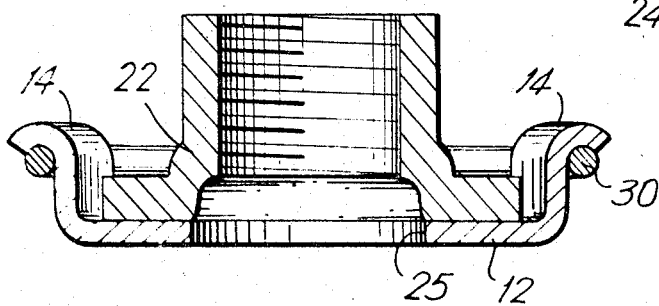
INVENTORS
ERVIN J. DEY
HARRY A. THEAKSTON, Jr.
BY
*Andrew L. Ney*
ATTORNEY

FLOATING FASTENER UNIT

The present invention relates, in general, to fastening devices and, in particular, to a unit having a floating fastener element which is permitted to undergo slight movements relative to a support component upon which the fastener element is mounted.

It is very difficult in the manufacture and assembly of large structures, such as airplane frames, to achieve exact alignment between mating fastener elements. In order to overcome this difficulty, floating fasteners are employed to accommodate slight misalignments between complementary fastener elements which are within prescribed tolerances.

It is an object of the present invention to provide a new and improved floating fastener device.

It is a further object of the present invention to provide a fastener unit which is relatively simple in construction, inexpensive to fabricate and highly reliable in operation.

Briefly stated, a floating fastener unit constructed in accordance with the present invention includes a retainer shell within which a fastener element is contained. The retainer shell has a base and a plurality of peripheral flanges extending upward away from the base. These flanges extend around a substantial portion of the periphery of the base and are separated by spaces of prescribed width. The fastener element located within the retainer shell has a body portion and a plurality of lugs which extend into the spaces between the peripheral flanges. The fastener element is retained within the shell by means of a retaining clip which extends around the periphery of the shell within the peripheral flanges and across the lugs. As a result, the retainer clip captivates the lugs of the fastener element between the clip and the base of the retainer shell. The lugs on the fastener element and the spaces between the peripheral flanges are dimensioned to permit the fastener to float within the retainer shell.

For a better understanding of the present invention, together with other and further objects thereof, reference is made to the following description, taken in connection with the accompanying drawing, and its scope will be pointed out in the appended claims.

Referring to the drawing:

FIG. 1 is a perspective view of a floating fastener unit constructed in accordance with the present invention;

FIG. 2 is a plan view of the fastener unit in FIG. 1;

FIG. 3 is a vertical section taken along line 3–3 of FIG. 2;

FIG. 4 is a perspective view of the retainer shell employed in the fastener unit illustrated in FIG. 1; and FIG. 5 is a perspective view of the nut element also employed in the fastener unit illustrated in FIG. 1.

Referring to FIGS. 1 through 5, inclusive, a floating fastener unit constructed in accordance with the present invention includes a retainer shell 10 having a base 12 and a plurality of peripheral flanges 14. For the particular embodiment illustrated, the retainer shell 10 has four peripheral flanges separated by four spaces of prescribed width disposed 90° apart. Each of the flanges 14 extends upwardly from the base 12 and away from the center of the base. The flanges are curled at their outer ends. The base 12 is seen to be of circular shape. As a result, peripheral flanges 14 are curved.

Positioned within the retainer shell 10 is a fastener element 20. While the particular embodiment of the invention which is illustrated is seen to employ a nut element as the fastener, it will be apparent that a bolt or other type of fastener also may be employed. Nut element 20 has a body portion 22 and a plurality of lugs 24. Lugs 24 are arranged to extend into the spaces between peripheral flanges 14. Body portion 22 may be elliptically deformed, as best seen in FIG. 2, to render the nut element self-locking. When employing a nut element in the fastener unit of the present invention, base 12 of retainer shell 10 is provided with a central hole 25 aligned with the barrel of the nut to permit the threaded shank of a bolt received by the nut to pass through the base.

Nut element 20 and retainer shell 10 are shaped and dimensioned to permit the nut element to float within the shell. The size of hole 25 in the base of the shell is selected to accommodate this float.

Extending around the periphery of retainer shell 10 are removable retaining means which prevent removal of nut element 20 from shell 10 while the retaining means are in place. The particular means employed in the embodiment illustrated in the drawing is a spring retainer clip 30. When in position, portions of clip 30 lie beneath peripheral flanges 14 while other portions of the clip overlie lugs 24. As a result, with clip 30 in place, nut element 20 is held captive in the retainer shell. When the nut element is moved in a direction generally perpendicular to the plane of the base of shell 10, lugs 24 eventually come to bear against clip 30 and the clip, in turn, bears against the undersides of flanges 14. The ends 30a of clip 30 are seen to be bent inwardly toward the center of retainer shell 10. As retainer shell 10 is subjected to axial forces which force peripheral flanges 14 radially outward, the curled ends 30a of clip 30 bear against the inside walls of the peripheral flanges to prevent clip 30 from coming loose from the retainer shell.

A fastener unit constructed in accordance with the present invention is assembled by placing the fastener element within the retainer shell and snapping the retainer clip under the peripheral flanges. The assembled unit may be applied to a support component (not shown) by welding or riveting the retainer shell to this support component. Alternatively, the retainer shell may be secured to a support component prior to the fastener unit being assembled.

At this point, it is worthwhile to consider some of the advantageous features of a floating fastener unit constructed in accordance with the present invention. Among the more important features is the provision that the peripheral flanges 14 extend around a substantial portion of the periphery of retainer shell 10. This permits the fastener element contained within retainer shell 10 to be subjected to high axial forces without the fastener element being torn from the retainer shell. In contrast, many fastening units which are presently available commercially and which have been designed to perform the same functions as the unit of the present invention are provided with insufficient retaining means to permit their use in high-strength joints.

Another important feature of the present invention is that it is capable of handling high-shear loads. Lugs 24 are arranged to bear against the edges of the peripheral flanges when subjected to horizontal or rotational forces in contrast to certain prior art devices in which the fastener elements bear against an inside flange wall as, for example, in a channel.

Still another feature of the present invention is the four-point stability and high push-out strength achieved through the use of four lugs on the nut element with the lugs disposed 90° apart.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

We claim:

1. A floating fastener unit comprising:
    a retainer shell having a base and a plurality of peripheral flanges extending away from said base and around a substantial portion of the periphery thereof, said peripheral flanges separated by spaces of prescribed width;
    a fastener element having a body portion and a plurality of lugs, said fastener element positioned within said retainer shell with said lugs extending into said spaces between said peripheral flanges; and
    a split ring retainer clip extending around said periphery of said shell within and to one side of said peripheral flanges and across said lugs to prevent removal of said fastener element from said shell while said clip is in place, the free ends of said clip bent around oppositely disposed edges of two adjacent peripheral flanges to bear against the opposite sides of said two adjacent peripheral flanges upon expansion of said clip.

2. A floating fastener unit according to claim 1 wherein said base of said retainer shell is circular and said peripheral flanges are curved.

3. A floating fastener unit according to claim 2 wherein said retainer shell has four peripheral flanges separated by four spaces of prescribed width disposed 90° apart and said fastener element has four lugs which extend into said four spaces.

4. A floating fastener unit comprising:
- a circular retainer shell having a base and a plurality of circumferential flanges extending upwardly from said base and away from the center thereof, said flanges extending around a substantial portion of the periphery of said shell and separated by spaces of prescribed width;
- a fastener element having a body portion and a plurality of lugs, said fastener element positioned within said retainer shell with said lugs extending into said spaces between said flanges; and
- a split spring retainer clip extending around said periphery of said shell with portions of said clip positioned beneath and to one side of said flanges and other portions of said clip overlying said lugs, the free ends of said clip bent around oppositely disposed edges of two adjacent peripheral flanges to bear against the opposite sides of said two adjacent peripheral flanges upon radial expansion of said clip.

5. A floating unit according to claim 4 wherein said peripheral flanges are curled at their outer ends.

6. A floating fastener unit according to claim 4 wherein said fastener element is a nut and said base of said retainer shell has a central hole aligned with the barrel of said nut to permit a threaded shank received by said nut to pass through said base.

7. A floating fastener unit comprising:
- a fastener element having a body portion and a plurality of lugs extending away from said body portion;
- a retainer shell within which said fastener element is positioned, said retainer shell having a base and a peripheral flange interrupted at a plurality of points by spaces of prescribed width into which said lugs extend; and
- a split retainer ring extending around the periphery of said shell and positioned within and to one side of said peripheral flange and across said lugs to captivate said lugs between said ring and said base of said shell, the free ends of said ring bent around oppositely disposed edges of said peripheral flange formed by said spaces in said peripheral flange to bear against the opposite side of said peripheral flange upon radial expansion of said ring.